US008130767B2

(12) United States Patent  (10) Patent No.: US 8,130,767 B2
Aitken et al.  (45) Date of Patent: Mar. 6, 2012

(54) METHOD AND APPARATUS FOR AGGREGATING NETWORK TRAFFIC FLOWS

(75) Inventors: Paul Aitken, West Linton (GB); Paul Atkins, Edinburgh (GB); Mark Hannah, Glasgow (GB); George Macrae Taylor, Edinburgh (GB); Andrew Johnson, Scottish Borders (GB); Katriona Lightbody, Midlothian (GB)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 11/156,071

(22) Filed: Jun. 17, 2005

(65) Prior Publication Data

US 2006/0285495 A1  Dec. 21, 2006

(51) Int. Cl.
H04L 12/28 (2006.01)
(52) U.S. Cl. .................. 370/401; 370/469; 370/473
(58) Field of Classification Search .......... 370/229–235; 709/225
See application file for complete search history.

(56) References Cited

U.S. PATENT DOCUMENTS

| | | | |
|---|---|---|---|
| 5,440,556 A | | 8/1995 | Edem et al. |
| 6,418,139 B1 * | | 7/2002 | Akhtar .......................... 370/356 |
| 6,823,387 B1 | | 11/2004 | Srinivas |
| 7,047,309 B2 * | | 5/2006 | Baumann et al. ............. 709/232 |
| 2001/0055274 A1 * | | 12/2001 | Hegge et al. ................... 370/229 |
| 2002/0080824 A1 | | 6/2002 | Wingrove |
| 2002/0191539 A1 * | | 12/2002 | Rawlin et al. ................. 370/229 |
| 2003/0014665 A1 * | | 1/2003 | Anderson et al. ............. 713/201 |
| 2003/0058842 A1 * | | 3/2003 | Bud ............................... 370/352 |
| 2003/0088671 A1 * | | 5/2003 | Klinker et al. ................ 709/225 |
| 2003/0120817 A1 * | | 6/2003 | Ott et al. ........................ 709/249 |
| 2004/0208122 A1 * | | 10/2004 | McDysan .................... 370/230 |
| 2006/0072455 A1 | | 4/2006 | Cai et al. |
| 2006/0171311 A1 * | | 8/2006 | Naik et al. .................... 370/229 |
| 2006/0203721 A1 * | | 9/2006 | Hsieh et al. ................... 370/229 |

OTHER PUBLICATIONS

Cisco Systems, Inc., "NetFlow MIB and Top Talkers", Cisco IOS Releases, copyright 2005, 36 pgs.
Peter J. Welcher, "NetFlow", Chesapeake Netcraftsmen, dated May 8, 2001, copyright 2001, 7 pgs.
Mark Fullmer, et al., "The OSU Flow-tools Package and Cisco NetFlow Logs", The Proceedings, pp. 291-303.
Chen-Nee Chuah, et al., "DCAP: Detecting Misbehaving Flows Via Collaborative Aggregate Policing", 14 pgs.
Cisco Systems Inc., "Configuring SNMP and the NetFlow MIB to Monitor NetFlow Data", Cisco IOS NetFlow Configuration Guide, copyright 2006, 26 pgs.
Jorg Wallerich, et al., "A Methodology for Studying Persistency Aspects of Internet Flows", ACM SIGCOMM Computer Communication Review 2004, 13 pgs.

* cited by examiner

Primary Examiner — Seema S Rao
Assistant Examiner — Wanda Russell
(74) Attorney, Agent, or Firm — Hickman Palermo Truong & Becker LLP

(57) ABSTRACT

A method of aggregating network traffic flows for network traffic elements is described. The traffic elements are characterized by a plurality of characteristics having respective values, where a flow profile is formed by classifying each element into one of a plurality of flows dependent on its characteristic value. The method comprises the steps of obtaining an instantaneous flow profile and aggregating flows from the flow profile having a common value for a characteristic.

28 Claims, 8 Drawing Sheets

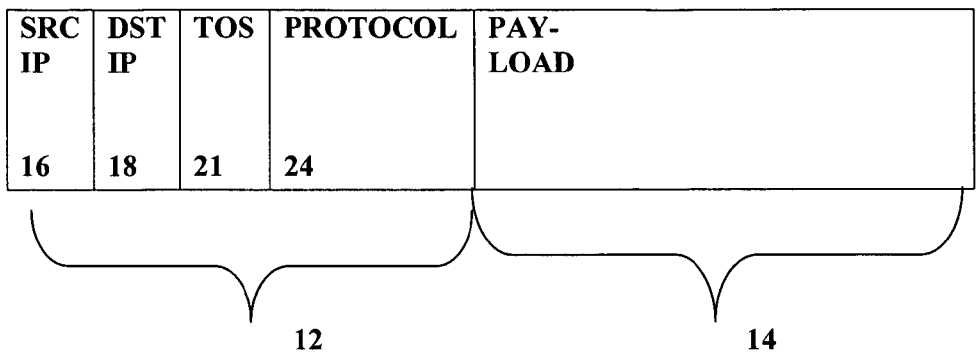
FIG. 1A
FIG. 1B
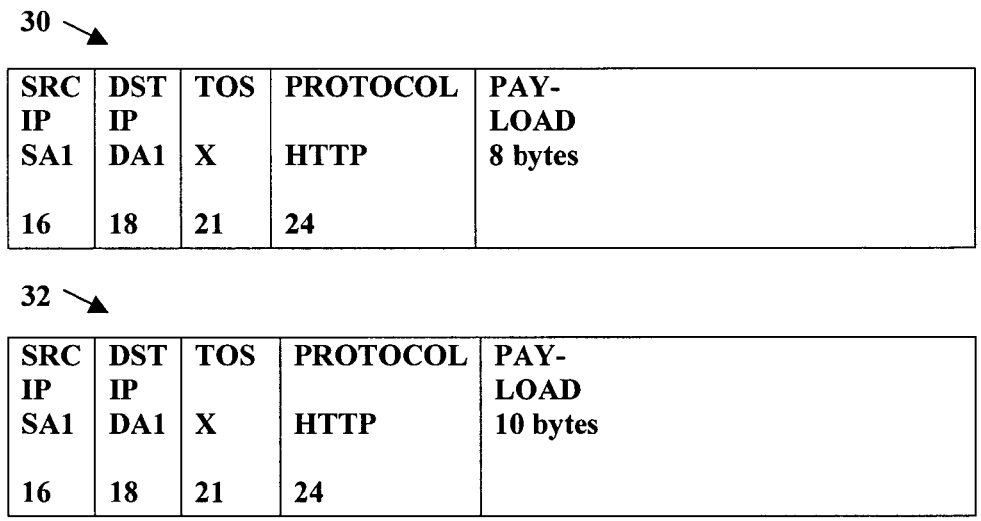
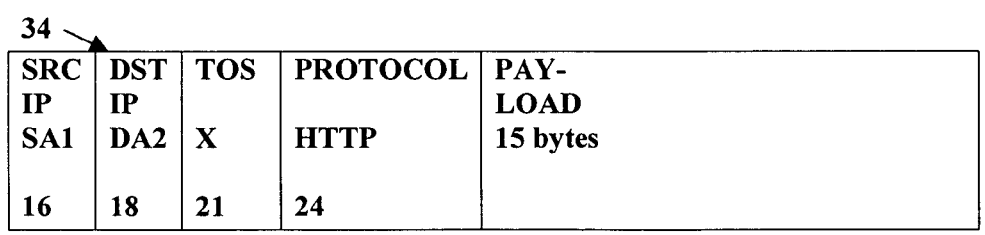
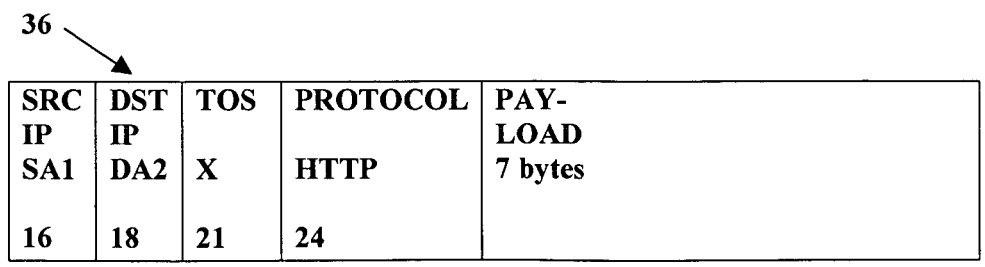

| SRC IP | DST IP | TOS | PROTOCOL | FLOW COUNT | SIZE |
|---|---|---|---|---|---|
| SA1 | DA1 | X | HTTP | 2 | 18 bytes |
| 16 | 18 | 21 | 24 | 25 | 27 |

| SRC IP | DST IP | TOS | PROTOCOL | FLOW COUNT | SIZE |
|---|---|---|---|---|---|
| SA1 | DA2 | X | HTTP | 2 | 22 bytes |
| 16 | 18 | 21 | 24 | 25 | 27 |

FIG. 3

| AGG 302 | BYTES 304 | PACKETS 306 | FLOWS 308 |
|---|---|---|---|
| SA1 | 40 | 4 | 2 |

| AGG 302 | BYTES 304 | PACKETS 306 | FLOWS 308 | |
|---|---|---|---|---|
| DA4 | 22 | 2 | 1 | } 310 |
| DA3 | 18 | 2 | 1 | } 312 |

METHOD AND APPARATUS FOR AGGREGATING NETWORK TRAFFIC FLOWS

FIELD OF THE INVENTION

The present invention generally relates to network traffic flow. The invention relates more specifically to a method and apparatus for aggregating network traffic flows.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols. Elements in the network are typically identifiable by a unique internet protocol (IP) address.

One routing protocol used, for example, in the internet is Border Gateway Protocol (BGP). BGP is used to route data between autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Within each AS the routing protocol typically comprises an interior gateway protocol (IGP) for example a link state protocol such as open shortest path first (OSPF) or intermediate system—intermediate system (IS-IS).

Where the network carries different types of traffic, for example email or video traffic, this may be handled by separate processes or ports on network components.

It is desirable in many instances to monitor the flow of network traffic for various purposes such as security and billing. The information derived can be used to identify, for example, "top talkers", that is, the noisiest protocol or most prolific addresses used. The information can be employed, for example, for network profiling, traffic analysis or for security purposes such as attack mitigation.

One way of monitoring the flow of network traffic is to categorize data packets forming the traffic as one of a plurality of "flows". According to this approach packets with common characteristics or key fields are grouped together as a flow. One example of such an approach is the NetFlow™ product which is a feature of Cisco IOS® software available from Cisco Systems, Inc, San Jose, Calif., USA. According to this approach, packets sharing a common set of key fields, defined as source and destination IP address, source and destination port, protocol, Type of Service (ToS) and input interface are classified as a single flow within a router through which the packets pass. By comparing such flows, information such as the flow having the largest number of packets or the largest number of bytes can be identified. In some instances not all packets are processed, but are randomly sampled, where a full view of all packets is not required.

However it would be desirable to derive yet further information from the flow profile created. For example the flows are categorized in too much detail to identify a particular source, destination or protocol which is consuming network bandwidth. In the case of attack mitigation in a Denial of Service (DoS) attack, an attacker sending many small flows from a multitude of spoofed source IP addresses may never show as a "top talker" because each separate flow only consists of a few packets and is short-lived.

According to existing flow monitoring schemes, flows are cached at the router allowing the relevant information to be derived from them. For example referring to FIGS. 1A, 1B and 1C which are schematic diagrams showing packets and classification of packets into flows to form a flow profile, a packet 10 is shown having a header 12 and a payload 14 (not shown to scale in terms of number of bits). The header 12 includes various fields including source IP address 16, destination IP address 18, ToS 21 and protocol 24.

Referring to FIGS. 1B and 1C, four packets 30, 32, 34, 36 are classified into two flows 38, 40. The first flow, 38 comprises two packets, 30, 32 with common source IP address SA1, destination IP address DA1, ToS "X" HTTP protocol, source and respective payloads of size 8 bytes and 10 bytes. As a result the size of the first flow 38 is recorded as two fields containing a count of the number of packets "FLOW COUNT" 25 and a count of the number of bytes "SIZE" 27, in this case: two packets and 18 bytes. A second flow 40 comprises packets 34, 36, having source IP address SA1, destination IP address DA2, ToS "X", HTTP protocol, respective payloads of size 15 bytes and 7 bytes. As a result the flow 40 is of size two packets and 22 bytes.

It will be seen that caching of flows requires significant storage requirements as a result of which the cached flows are periodically exported to a remote node termed a "collector" node. Export can take place upon various criteria being fulfilled. For example if a flow is continuing then cached entries for the flow can be exported upon expiry of a timer. If a flow is dormant for a predetermined period or terminated (for example the TCP connection is terminated), again the entries can be exported to a collector. At this time the exported flows can be aggregated according to one of various schemes in existing systems. For example flows can be grouped together with common source and destination AS and interface, the aggregation scheme further containing a record of the number of packets, number of flows, number of bytes and time stamp of first and last packets in the aggregation. Other schemes have been adopted including prefix aggregations, port or protocol aggregations or type of service (ToS) aggregations.

However it is desirable for the aggregations to be more flexible. In the case of a network attack such as a DoS attack, the aggregations, being dependent upon various varying time out or expiry criteria, provides an outdated and/or an inaccurate snapshot of the flow profile at the router such that useful information is not derivable on the timescales required to deal with security issues, i.e., data is not provided in real time. Furthermore existing aggregation schemes contain, in some instances, an excess of information meaning that tailored analysis can be hindered.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a schematic diagram showing a packet format;

FIG. 1B is a schematic diagram showing packets to be classified into a flow profile;

FIG. 3 is a schematic diagram of a first aggregated flow record according to the method described herein;

FIG. 4 is a schematic diagram of a second aggregated flow record according to the method described herein;

DETAILED DESCRIPTION OF THE PREFERRED EMBODIMENT

A method and apparatus for aggregating network traffic flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Aggregating Network Traffic Flows
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method of aggregating a network traffic flows for network traffic elements characterized by a plurality of characteristics having respective values. A flow profile is formed by classifying each element into one or more plurality of flows dependent on its characteristic values. The method comprises steps of obtaining a instantaneous flow profile and aggregating flows from the flow profile having a common value for a selected characteristic.

In other aspects, the invention encompasses a computer apparatus and a computer-readable medium configured to carry out the foregoing steps.

2.0 Structural and Functional Overview

Figure 2:
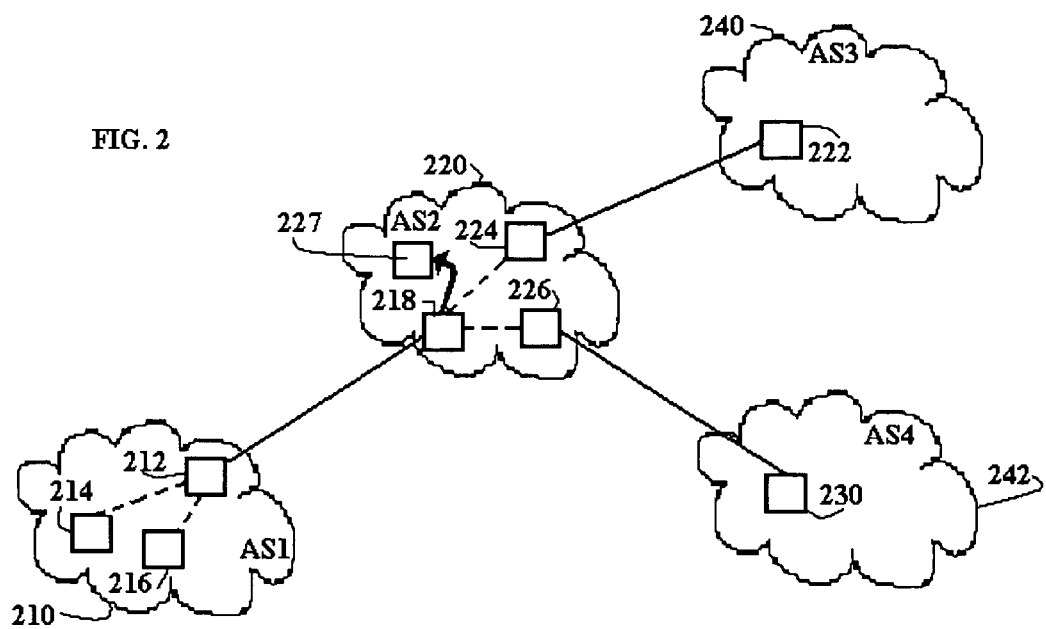
FIG. 2 is a representation of a network in which traffic flows are aggregated.

In overview a method of aggregating network traffic flows can be understood with reference to FIG. 2 which depicts an illustrative network to which the method is applied. The network includes a first AS 210 including nodes 212, 214, 216 having respective IP addresses. A further AS, AS2 reference numeral 220, includes nodes 218, 224, 226, 227. Two further AS's, AS3, reference numeral 240 and AS4, reference numeral 242 include respective nodes 222, 230. Where node 212 in AS1 receives a packet destined, for example, for node 222 in AS3, the packet is routed via node 218 in AS2 to node 224 in AS2 and then to node 222 in AS3. Where node 212 forwards a packet for node 230 in AS4 this is forwarded via node 218 in AS2 to node 226 in AS2 and then to node 230.

Where the node 218 acts as flow monitoring node, that is, a traffic flow monitoring functionality is enabled, packets passing through the node are classified into respective flows dependent on characteristic or field values ("flow keys"), as described above. Referring to the example described with reference to FIG. 1B, which is formulated purely for the purposes of explanation and is not limiting, it will be seen that, where node 214 has an IP address value SA1 and node 212 forwards packets from node 214 to node 222 in AS3 which has IP address value DA1, then these packets are classified into the first flow 38 in FIG. 1B. However where packets are directed from node 214 to node 230 in AS4 having destination IP address value DA2 then this is classified into the second flow 40 shown in FIG. 1B, providing the flow profile described above. It will be appreciated that any additional or alternative fields, characteristics or address types can be taken into account in classifying flows.

As described above, in conventional systems the flows are cached and periodically exported to a collector node shown as node 227 in FIG. 2 which is shown in AS2 but may be at any appropriate part of the network. Although aggregations may take place these are not in real time and are carried out according to predefined complex aggregation schemes.

According to the method described herein, instead of or in addition to any aggregation taking place at collector node 227, a further aggregation takes place at the monitoring node 218 itself, acting as an aggregating node. In particular an instantaneous flow profile is obtained from the node 218, that is, the status of all flows on the aggregator node 218 at a given instant. The flows are then aggregated based on common values for a selected characteristic comprising, in an embodiment, a key field or, in another embodiment, multiple key fields, or other data derivable from the packet header or in the packet itself including, for example data in inner headers in encapsulation schemes. For example, multiple flows can be combined according to a specific criterion such as address prefix, AS number or protocol. As a result discovery of "second level" top talkers can be provided in real time since all of the traffic associated with the specified key field, (such as prefix, AS or protocol) is aggregated together. This instantly shows which key field value, is responsible for most traffic providing key information for example at the first step of real time attack analysis.

Figure 1C:
FIG. 1C is a schematic diagram showing a flow profile for the packets of FIG. 1B.
Figure 1C:

FIGS. 3 and 4, which are schematic diagrams of aggregated flow records according to the method described herein, show possible aggregations of the flows shown in FIG. 1B. For example if the flows are aggregated by source AS then flows 38 and 40 which share a common Source Address, SA1, are aggregated to make a single aggregated flow entry 300 including record fields 302 showing the aggregation characteristic, 304 showing the number of bytes in the aggregated flows, 306 showing the number of packets in the aggregated flows and 308 showing the number of flows which were aggregated together in the aggregated flow. In particular it will be seen that the aggregated flow contains 40 bytes, four packets and two flows.

However if the flows are aggregated by a Destination Address then the aggregated flow record shown in FIG. 4 is arrived at in which two entries 310, 312 are derived respectively for Destination Address value DA3 (corresponding to DA1) and Destination Address value DA4 (corresponding to DA2). Record 310 for DA4 is 22 bytes, two packets, one flow. Record 312 for DA3 is 18 bytes, two packets, one flow.

It will be seen, therefore, that combining further information in real time on the node 218 provides higher level non-flow based information which can be utilized to determine any desired criteria or flow trend such as "noisiest source or destination prefix" "noisiest source or destination AS" or "noisiest protocol" based upon combined traffic characteristics. Furthermore by their focusing on the aggregating characteristic a network administrator can break down the aggregation to establish not only the flows contributing to the criteria but also the originator of the flows, for example by examining the flows in the cache (akin to zero-aggregation) or using one-step aggregation, even though the contributors may not be of any particular significance in themselves—i.e., they would not be considered "top" in themselves. This can be essential information for example for real time attack analysis and capacity planning, identifying for example flows which are consuming the most network bandwidth.

Because an instantaneous flow profile is used, an accurate and immediate picture of network usage can be derived, of benefit for example in security applications. Because the aggregation is based on a single or limited set of criteria and contains limited information, it can be manipulated quickly and analyzed simply. Furthermore the provision of simple or tailored aggregations allows design for specific purposes such as identification and mitigation of DoS attacks.

3.0 Method and Apparatus for Aggregation Network Traffic Flows

Figure 5:
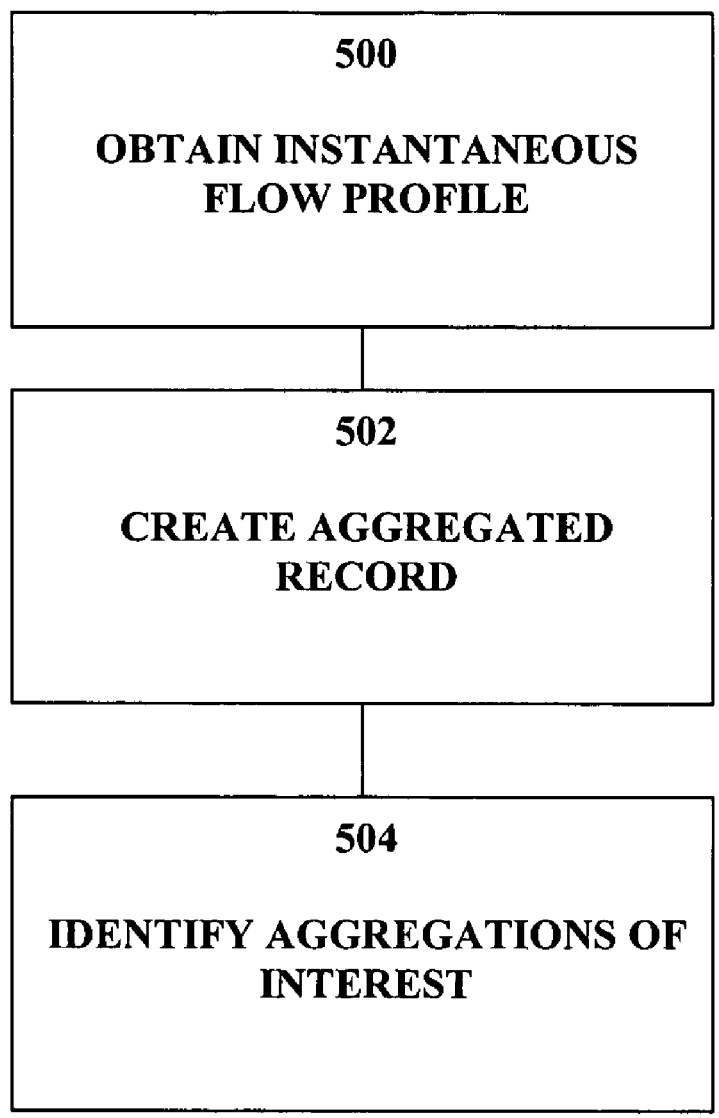
FIG. 5 is a flow diagram illustrating steps performed in aggregating traffic flow according to the method described herein.

The approach described herein can be further understood with respect to FIG. 5 which is a flow diagram illustrating aspects of the method. In block 500 an instantaneous flow profile is obtained. This can be carried out at any desired time. For example the flow profile can be obtained effectively continuously or when certain values such as number of packets, number of flows or number of values in a certain field exceed a predetermined criteria. Alternatively again a flow profile can be obtained at predetermined intervals or upon demand for example by a network administrator. The flow profile can be obtained in real-time or with a delay in non-time-critical applications where, nonetheless, an instantaneous profile showing the exact state of the flows at a given instant is required.

In block 502 an aggregated record is created based on any desired characteristic or field for example as shown in FIG. 3 or FIG. 4. In addition to source or destination IP address, as previously shown, other fields can include source or destination prefix, protocol and so forth. The selected field can be adopted dependent on the information required and any field in the packet could be used, and even other information about the packet such as which interface it arrived on, which random sampler actually sampled it, or which source and destination AS it's associated with. For example where the destination information is of particular relevance then it is useful to look at fields representative of inbound packet information such as source IP address, prefix or AS. Conversely where it is intended to investigate the source then destination information such as destination IP address, prefix or AS is of particular interest providing a significant tool in such circumstances.

Alternatively again it may be desired to investigate flows of different types of protocol such as http (HyperText Transfer Protocol), SMTP (email) VoIP (voice over internet protocol), video and so forth. For example where a flow change is suddenly or unexpectedly identified in relation to a previously quiescent or busy protocol then this may represent unusual activity requiring further investigation or mitigation. Accordingly, in block 504 aggregations are examined and those of particular interest are identified. These may represent any appropriate flow trend or behaviour, for example "top talker", "bottom talker", unexpected protocols, number of packets or number of bytes exceeding or falling below predetermined thresholds and so forth.

Figure 6:
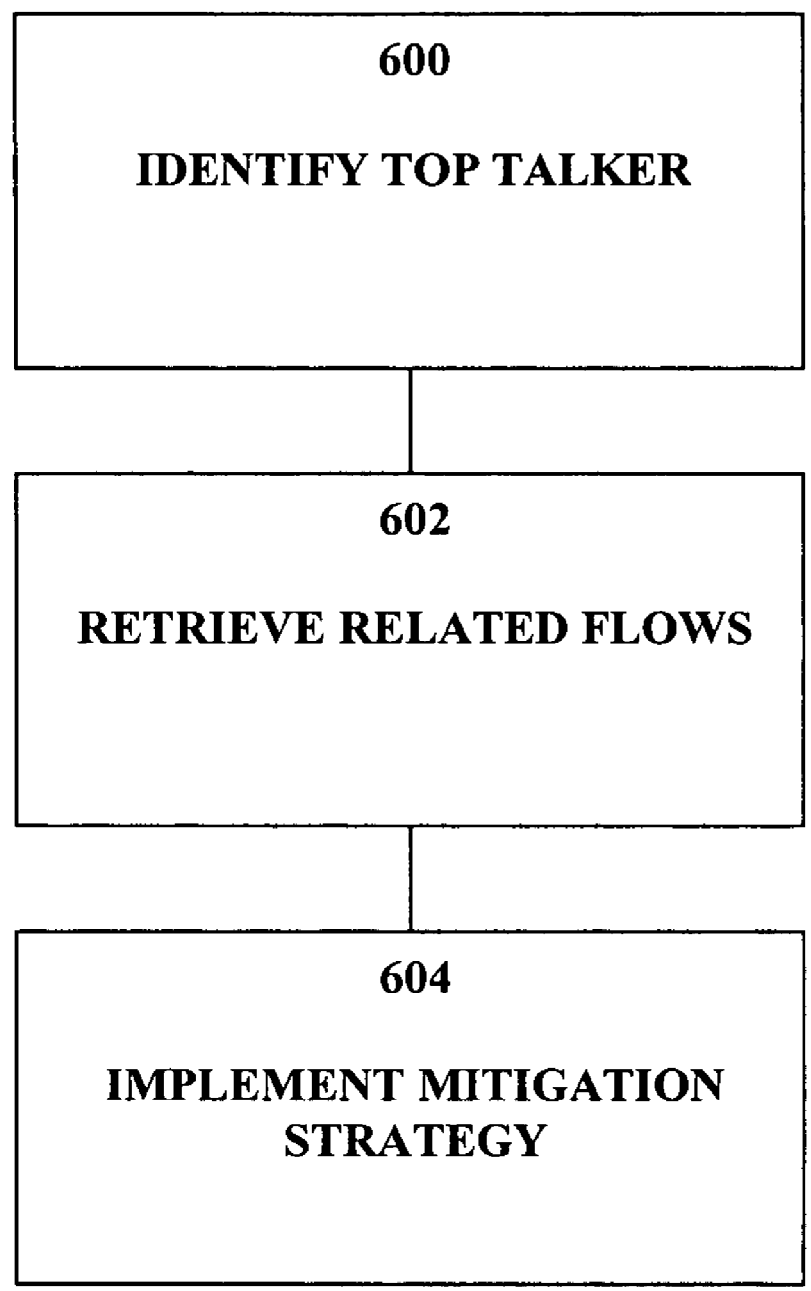
FIG. 6 is a flow diagram illustrating steps performed in relation to the information derived from traffic flow aggregated according to the method described herein.
Figure 7:
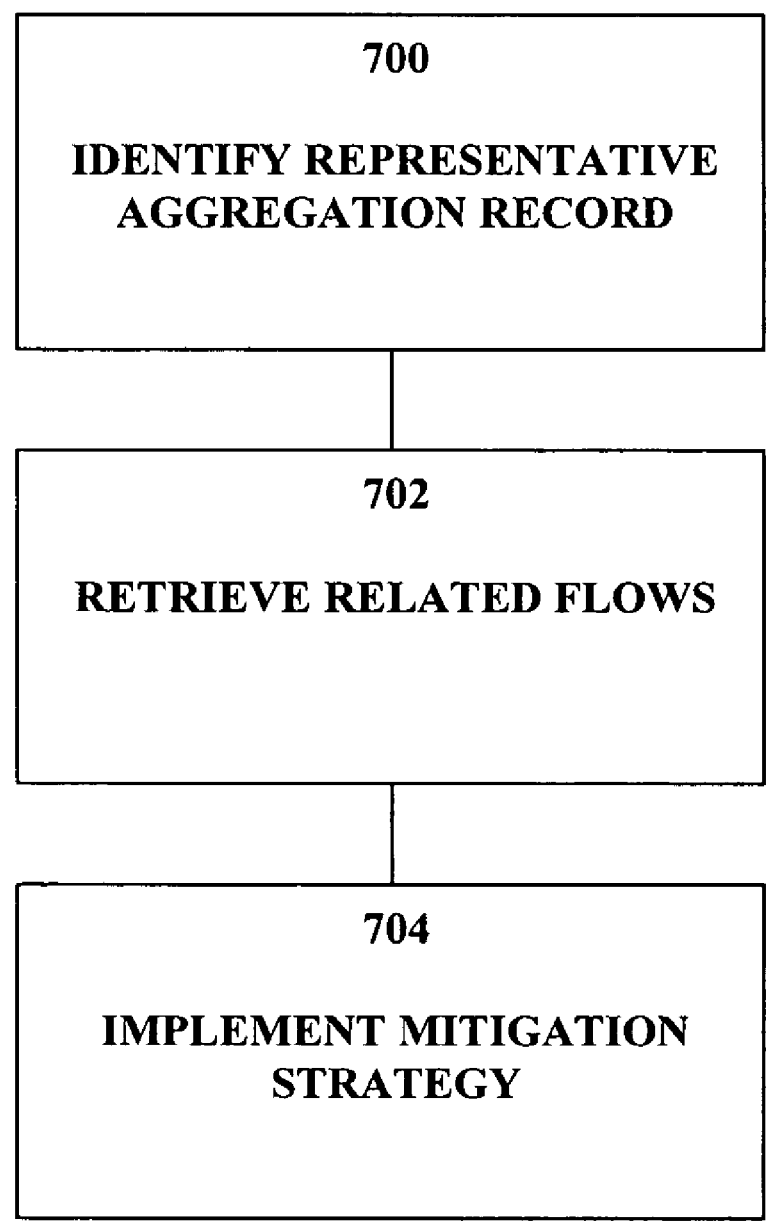
FIG. 7 is a flow diagram illustrating alternative steps performed in relation to the information derived from traffic flow aggregated according to the method described herein.

Referring now to FIGS. 6 and 7 which are flow diagrams illustrating further aspects of the method described herein, appropriate action can be taken in relation to the flow trend information derived from the aggregated flows. It will be appreciated that the information can be used in various ways, for example network management such as profiling, traffic analysis or capacity planning, or security issues such as attack mitigation. For example in the case of a DoS attack where multiple packets are sent to a destination to overwhelm the server, it is common for "spoof" source addresses to be used such that it appears that the packets are originating from multiple different sources. In the simplified network example shown in FIG. 2, it may be the case that the source address of packets is given as either of node 214 or node 216. However both nodes are found in AS1. In this case an appropriate aggregation criterion can be source AS. In that instance AS1 will be identified as top talker so further examination of the AS1 traffic would be warranted.

Referring to FIG. 6, therefore, in block 600 the AS top talker is identified as AS1. In block 602 it is then possible to retrieve the related flows, for example from the cached flow profile. In block 604 appropriate attack mitigation strategies can be implemented. For example all packets from AS1 can be filtered out, or the packets can be tracked back through each ISP to identify the true source of the attack. For example, the same techniques can now be performed on node 212 to discover the traffic's true source.

Referring to FIG. 7, network management is carried out in view of the information derived from the aggregated flows. In block 700 the represented aggregation record is identified. For example this may be top or bottom talker or introduction of a flow using an unexpected or previously quiescent protocol. Alternatively again a previously busy protocol may be identified as having unexpectedly stopped use. In block 702 the related flows are retrieved providing additional information concerning the characteristic of interest. For example where very heavy traffic is identified consuming significant bandwidth then the source of this traffic may be identified. In block 704 an appropriate mitigation strategy is implemented. For example an administrator may vary metrics so as to reduce the traffic via certain routes and redistribute it, prioritize essential traffic, block illegal traffic (e.g., prohibit certain protocols), or purchase additional links for load sharing.

Accordingly it will be seen that the real-time or instantaneous snapshot of a flow profile is of benefit in various areas. Furthermore the restricted amount of information stored in the aggregation allows fast processing and analysis, especially if a single characteristic or predetermined restricted set of characteristics are determined as the basis for the aggregation.

It will be appreciated by the skilled reader that the steps described herein can be implemented in any appropriate manner, for example by incorporating appropriate code into an existing flow monitoring application such that detailed description is not required herein.

4.0 Implementation Mechanisms—Hardware Overview

Figure 8:
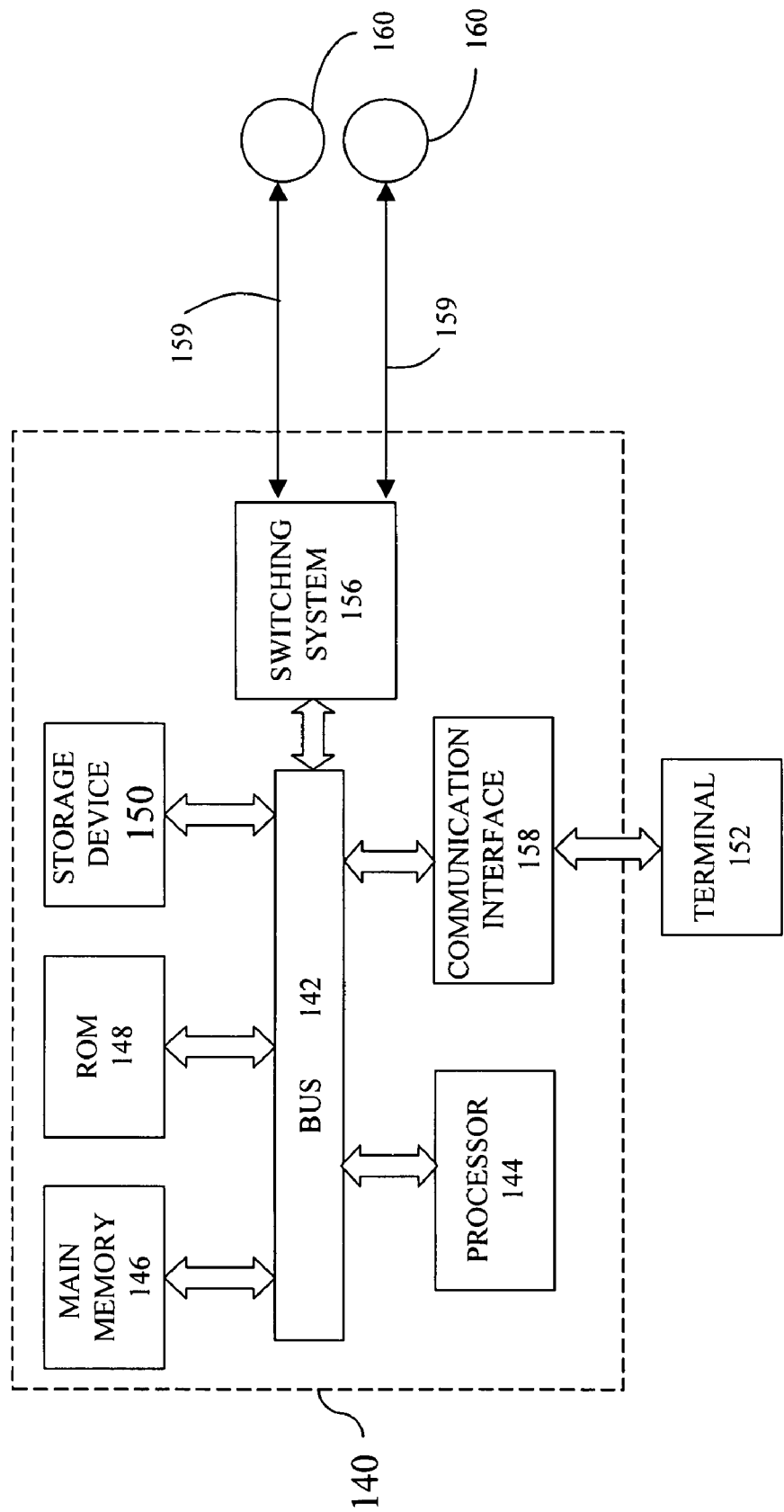
FIG. 8 is a block diagram that illustrates a computer system on which a method of aggregating network traffic flows may be implemented.

FIG. 8 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as an aggregating node the above described method of aggregating network traffic flows. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Aspects or examples or embodiments described can be juxtaposed or interchanged as appropriate.

It will be appreciated that the aggregation can be carried out on the node caching the flows or on a remote node, for example an existing collector node in the case that real-time processing is not required. The flows can be based around any appropriate field or characteristic or value or multiple instances thereof, or any other identifying feature common to multiple packets and the aggregation can be determined similarly. The method can be applied in any appropriate network, any protocol and on any appropriate network component in relation to any data type or element, for example data packets.

What is claimed is:

1. A method of aggregating network traffic flows for network traffic elements characterized by a plurality of characteristics having respective values, the method comprising the steps of:
   receiving, at a router, network traffic elements that are flowing through the router;
   the router forming an instantaneous flow profile of the elements flowing through the router;
   wherein the instantaneous flow profile comprises information on the status of all flows on the router at a given instant; and
   wherein a flow represents a set of network traffic elements having common values for at least one of: source address, destination address, source port, destination port, and protocol;
   receiving, at the router, an aggregation characteristic;
   instead of or in addition to any aggregation taking place at a collector node, the router aggregating, in real time, a first set of two or more different flows from the flow profile having a first common value for the aggregation characteristic, to produce first aggregated flows;
   instead of or in addition to any aggregation taking place at a collector node, the router aggregating, in real time, a second set of two or more different flows from the flow profile having a second common value for the aggregation characteristic, to produce second aggregated flows;
   wherein the aggregation characteristic comprises at least one of source prefix, source autonomous system (AS), protocol, data in inner headers, arrival interface, or random sampler;
   determining whether the first aggregated flows represent more traffic than the second aggregated flows;
   in response to determining that the first aggregated flows represent more traffic than the second aggregated flows, determining that the first common value represents the noisiest value of the aggregation characteristic.

2. A method as claimed in claim 1 in which an aggregated flow is stored in a record having record fields.

3. A method as claimed in claim 2 in which the record fields include at least one of characteristic value, aggregated element size, number of aggregated elements and number of flows.

4. A method as claimed in claim 2 further comprising the steps of:
   examining aggregated flow records to detect a flow trend; and
   detecting the flow trend if a flow record field value meets a criterion.

5. A method as claimed in claim 4 in which the flow record field value is one of aggregated element size, number of aggregated elements or number of aggregated flows.

6. A method as claimed in claim 5 in which the criterion is one of an upper or lower record field value.

7. A method as claimed in claim 4 in which the criterion is one of increase or decrease in selected characteristic value.

8. A method as claimed in claim 4 further comprising obtaining the flows corresponding to the aggregated flows associated with the detected flow trend to examine the flow trend.

9. A method as claimed in claim 1 further comprising implementing at least one of the group of network management or attack mitigation based on the first aggregated flows.

10. A method as claimed in claim 9 comprising identifying a network attack from the first aggregated flows based, at least in part, on the noisiest value of the aggregation characteristic.

11. A method as claimed in claim 10 further comprising initiating an attack mitigation strategy upon identification of the network attack.

12. A method as claimed in claim 1 in which the instantaneous flow profile is obtained in real time.

13. A method as claimed in claim 1 in which a network traffic element comprises a packet.

14. A method of investigating a network attack using network traffic flows for network traffic elements characterized by a plurality of characteristics having respective values, the method comprising the steps of:
   receiving, at a router, network traffic elements that are flowing through the router;
   the router forming an instantaneous flow profile of the elements flowing through the router;
   wherein the instantaneous flow profile comprises information on the status of all flows on the router at a given instant;
   wherein a flow represents a set of network traffic elements having common values for at least one of: source address, destination address, source port, destination port, and protocol;
   receiving, at the router, an aggregation characteristic;
   instead of or in addition to any aggregation taking place at a collector node, the router aggregating, in real time, a first set of two or more different flows from the flow profile having a first common value for the aggregation characteristic, to produce first aggregated flows;
   instead of or in addition to any aggregation taking place at a collector node, the router aggregating, in real time, a second set of two or more different flows from the flow profile having a second common value for the aggregation characteristic, to produce second aggregated flows;
   wherein the aggregation characteristic comprises at least one of source prefix, source autonomous system (AS), protocol, data in inner headers, arrival interface, or random sampler;
   determining whether the first aggregated flows represent more traffic than the second aggregated flows;
   in response to determining that the first aggregated flows represent more traffic than the second aggregated flows, determining that the first common value represents the noisiest value of the aggregation characteristic; and
   identifying the network attack from the first aggregated flows based, at least in part, on the noisiest value of the aggregation characteristic.

15. A method as claimed in claim 14 further comprising initiating an attack mitigation strategy upon identification of the network attack.

16. A method of managing a network based on network traffic flows for network traffic elements characterized by a plurality of characteristics having respective values, the method comprising the steps of:
   receiving, at a router, network traffic elements that are flowing through the router;
   the router forming an instantaneous flow profile of the elements flowing through the router;
   wherein the instantaneous flow profile comprises information on the status of all flows on the router at a given instant;
   wherein a flow represents a set of network traffic elements having common values for at least one of: source address, destination address, source port, destination port, and protocol;
   receiving, at the router, an aggregation characteristic;
   instead of or in addition to any aggregation taking place at a collector node, the router aggregating, in real time, a first set of two or more different flows from the flow profile having a first common value for the aggregation characteristic, to produce first aggregated flows;
   instead of or in addition to any aggregation taking place at a collector node, the router aggregating, in real time, a second set of two or more different flows from the flow profile having a second common value for the aggregation characteristic, to produce second aggregated flows;
   wherein the aggregation characteristic comprises at least one of source prefix, source autonomous system (AS), protocol, data in inner headers, arrival interface, or random sampler;
   determining whether the first aggregated flows represent more traffic than the second aggregated flows;
   in response to determining that the first aggregated flows represent more traffic than the second aggregated flows, determining that the first common value represents the noisiest value of the aggregation characteristic; and
   identifying a network management strategy from the first aggregated flows based, at least in part, on the noisiest value of the aggregation characteristic.

17. A computer-readable storage device carrying one or more sequences of instructions for aggregating network traffic flows for network traffic elements characterized by a plurality of characteristics having respective values, which instructions, when executed by one or more processors, cause:
   receiving, at a router, network traffic elements that are flowing through the router;
   the router forming an instantaneous flow profile of the elements flowing through the router;
   wherein the instantaneous flow profile comprises information on the status of all flows on the router at a given instant; and
   wherein a flow represents a set of network traffic elements having common values for at least one of: source address, destination address, source port, destination port, and protocol;
   receiving, at the router, an aggregation characteristic;
   instead of or in addition to any aggregation taking place at a collector node, the router aggregating, in real time, a first set of two or more different flows from the flow profile having a first common value for the aggregation characteristic, to produce first aggregated flows;
   instead of or in addition to any aggregation taking place at a collector node, the router aggregating, in real time, a second set of two or more different flows from the flow profile having a second common value for the aggregation characteristic, to produce second aggregated flows;
   wherein the aggregation characteristic comprises at least one of source prefix, source autonomous system (AS), protocol, data in inner headers, arrival interface, or random sampler;
   determining whether the first aggregated flows represent more traffic than the second aggregated flows;
   in response to determining that the first aggregated flows represent more traffic than the second aggregated flows, determining that the first common value represents the noisiest value of the aggregation characteristic.

18. A computer-readable storage device as claimed in claim 17 in which an aggregated flow is stored in a record having record fields that include at least one of characteristic value, aggregated element size, number of aggregated elements and number of flows.

19. A computer-readable storage device as claimed in claim 18, wherein the one or more stored sequences of instructions further comprise instructions which, when executed by the one or more processors, cause the one or more processors to carry out:
   examining aggregated flow records to detect a flow trend;
   detecting the flow trend if a flow record field value meets a criterion of aggregated element size, number of aggregated elements, number of aggregated flows, or increase or decrease in selected characteristic value.

20. A computer-readable storage device as claimed in claim 17, wherein the one or more stored sequences of instructions further comprise instructions which, when executed by the one or more processors, cause the one or more processors to carry out implementing at least one of the group of network management or attack mitigation based on the first aggregated flows.

21. A computer-readable storage device as claimed in claim 20, wherein the one or more stored sequences of instructions further comprise instructions which, when executed by the one or more processors, cause the one or more processors to carry out identifying a network attack from the first aggregated flows based, at least in part, on the noisiest value of the aggregation characteristic.

22. A computer-readable storage device as claimed in claim 21, wherein the one or more stored sequences of instructions further comprise instructions which, when executed by the one or more processors, cause the one or more processors to carry out initiating an attack mitigation strategy upon identification of the network attack.

23. An apparatus for aggregating network traffic flows for network traffic elements characterized by a plurality of characteristics having respective values, comprising:
   a network interface that is coupled to the data network for receiving one or more packet flows therefrom;
   a processor;
   a computer-readable data storage medium storing one or more stored sequences of instructions which, when executed by the processor, cause:
   receiving, at a router, network traffic elements that are flowing through the router;
   forming, at the router, an instantaneous flow profile of the elements flowing through the router;
   wherein the instantaneous flow profile comprises information on the status of all flows on the router at a given instant; and wherein a flow represents a set of network traffic elements having common values for at least one of: source address, destination address, source port, destination port, and protocol;

receiving, at the router, an aggregation characteristic;

instead of or in addition to any aggregation taking place at a collector node, aggregating, at the router in real time, a first set of two or more different flows from the flow profile having a first common value for the aggregation characteristic, to produce first aggregated flows;

instead of or in addition to any aggregation taking place at a collector node, aggregating, at the router in real time, a second set of two or more different flows from the flow profile having a second common value for the aggregation characteristic, to produce second aggregated flows;

wherein the aggregation characteristic comprises at least one of source prefix, source autonomous system (AS), protocol, data in inner headers, arrival interface, or random sampler;

determining whether the first aggregated flows represent more traffic than the second aggregated flows;

in response to determining that the first aggregated flows represent more traffic than the second aggregated flows, determining that the first common value represents the noisiest value of the aggregation characteristic.

24. An apparatus as claimed in claim 23 in which an aggregated flow is stored in a record having record fields that include at least one of characteristic value, aggregated element size, number of aggregated elements and number of flows.

25. An apparatus as claimed in claim 24, wherein the one or more stored sequences of instructions further comprise instructions which, when executed by the processor, cause the processor to perform:

examining aggregated flow records to detect a flow trend;

detecting the flow trend if a flow record field value meets a criterion of aggregated element size, number of aggregated elements, number of aggregated flows, or increase or decrease in selected characteristic value.

26. An apparatus as claimed in claim 23, wherein the one or more stored sequences of instructions further comprise instructions which, when executed by the processor, cause the processor to perform implementing at least one of the group of network management or attack mitigation based on the first aggregated flows.

27. An apparatus as claimed in claim 26, wherein the one or more stored sequences of instructions further comprise instructions which, when executed by the processor, cause the processor to perform identifying a network attack from the first aggregated flows based, at least in part, on the noisiest value of the aggregation characteristic.

28. An apparatus as claimed in claim 27, wherein the one or more stored sequences of instructions further comprise instructions which, when executed by the processor, cause the processor to perform initiating an attack mitigation strategy upon identification of the network attack.

* * * * *